April 30, 1963 N. VAN HURCK ET AL 3,087,993

ARRANGEMENT FOR THE STEREOPHONIC REPRODUCTION OF SIGNALS

Filed March 21, 1960 2 Sheets-Sheet 1

INVENTORS
NICOLAAS VAN HURCK
FRANS L.H.M. STUMPERS
BY
Frank R. Jifari
AGENT

INVENTORS

NICOLAAS VAN HURCK
FRANS L.H.M. STUMPERS

BY Frank R. Jifari [signature]
AGENT 3,087,993
Patented Apr. 30, 1963

3,087,993

ARRANGEMENT FOR THE STEREOPHONIC REPRODUCTION OF SIGNALS

Nicolaas van Hurck and Frans Louis Henri Marie Stumpers, Eindhoven, Netherlands, assignors to North American Philips Company, Inc., New York, N.Y., a corporation of Delaware Filed Mar. 21, 1960, Ser. No. 16,213
Claims priority, application Netherlands Mar. 23, 1959
6 Claims. (Cl. 179—15)

This invention relates to an arrangement for the stereophonic reproduction of signals which are supplied to the input circuit of the arrangement in the form of the sum signal $A+B$ of the coherent stereophonic signals A and B and of the difference signal $A-B$, which modulates a sub-carrier frequency in frequency, of these coherent stereophonic signals A and B, while the stereophonic reproducing arrangement is also provided with repoducing devices which lie in separate channels and are fed with the coherent stereophonic signals A and B. The arrangement described can be used in particular in a receiver for stereophonic broadcast reception, in which the sum signal $A+B$ and the difference signal which modulates the sub-carrier frequency in frequency modulate the broadcast carrier frequency, in magnetic tape reproducing apparatus, gramophones and the like.

In order ot obtain a stereophonic reproduction, it has already been suggested to supply, with the aid of separating filters, the sum signal $A+B$ to a first channel and the difference signal $A-B$, which modulates the sub-carrier frequency in frequency, to a second channel which includes a frequency detection device in order to detect the difference signal $A-B$ modulating the sub-carrier frequency, which difference signal together with the sum signal $A+B$ is supplied to the separate reproducing devices through an addition and subtraction device.

It is an object of the present invention to provide another design of an arrangement of the type described, which while improving the stereophonic reproduction quality, is distinguished by its simplicity, and whch further enables exsting devices for non-stereophonic reproduction to be completed for stereophonic reproduction with a minimum of additional elements.

The stereophonic reproducing arrangement in accordance with the invention is characterised in that the signals which appear at the input circuit of this arrangement and comprise the audio-frequency sum signal $A+B$ and the difference signal $A-B$, which modulates the sub-carrier frequency in frequency, are supplied together, through a transmission network having a transmission factor which, for the audio-frequency sum signal $A+B$, is substantially independent of the frequency and, for the sub-carrier frequency frequency-modulated by the difference signal $A-B$, varies in substantially linear relationship with the frequency to two amplitude detection devices which are connected with opposite conductivities with respect to the audio-frequency sum signal $A+B$, while each of the output circuits of these amplitude detection devices is connected to an input of one of the separate reception channels.

Figure 1:
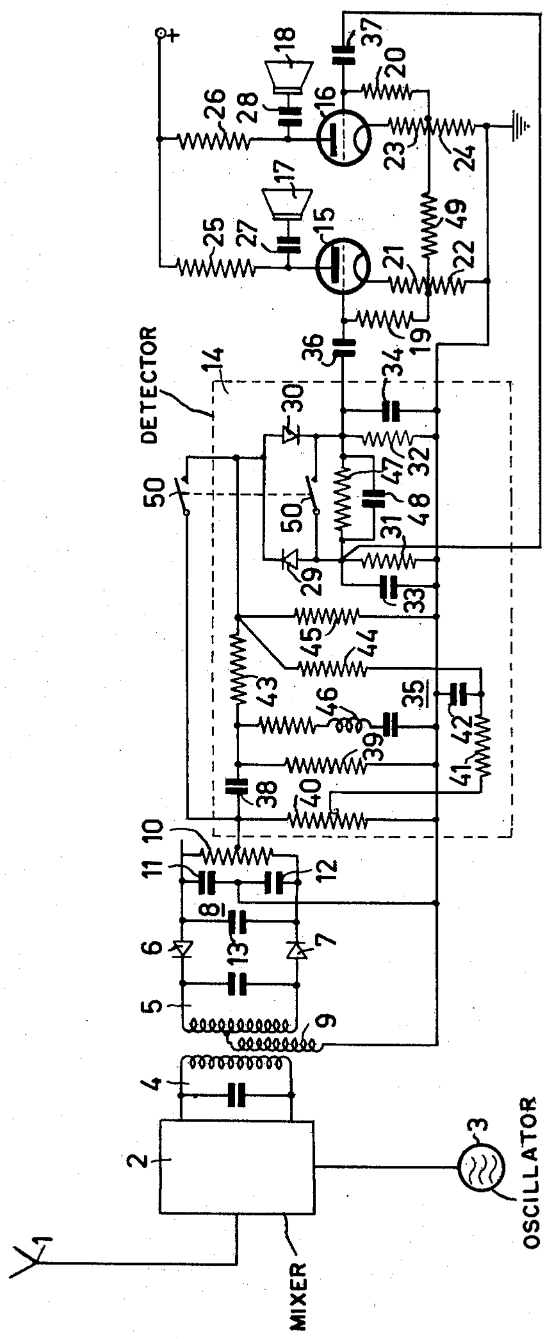
Figure 2:
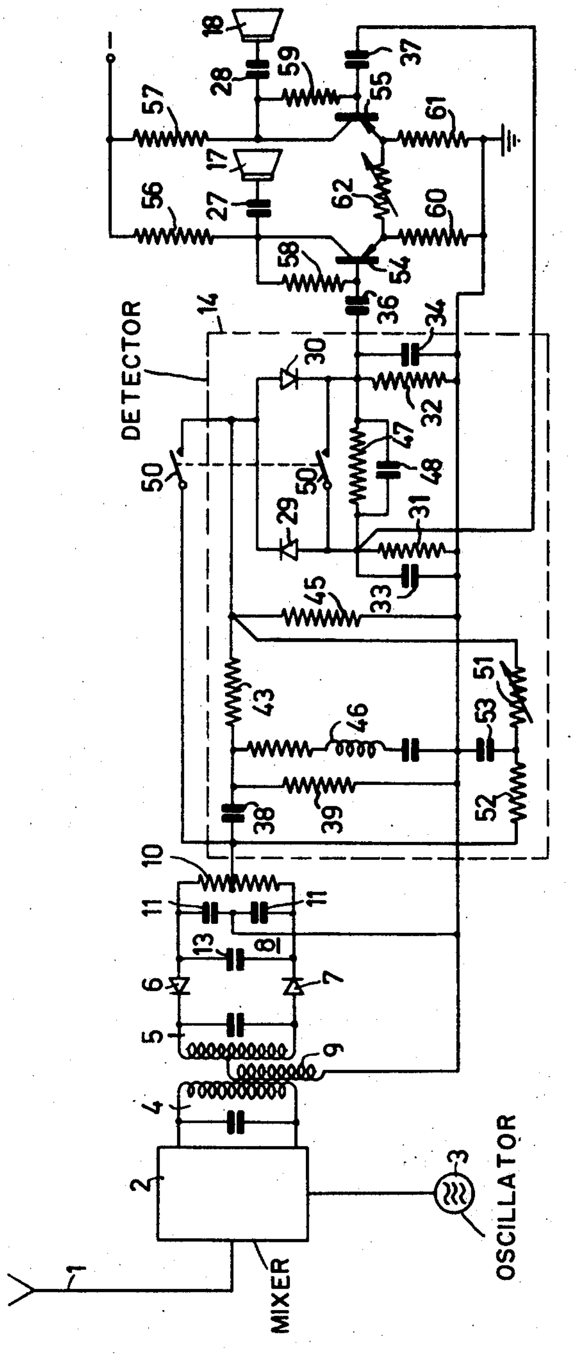

In order that the invention may readily be carried out, two embodiments thereof will now be described, by way of example, with reference to the accompanying diagrammatic drawings, in which:

FIG. 1 is a circuit diagram of a stereophonic broadcast receiver provided with a device in accordance with the invention, and FIG. 2 is a circuit diagram of a transistorized stereophonic receiver.

The stereophonic receiver shown in FIG. 1 is adapted to the reception of stereophonic signals transmitted as frequency-modulation signals modulating the same carrier frequency, which signals comprise the sum signal $A+B$ of the coherent stereophonic signals A and B, which may lie within the band of from 30 c./s. to 15,000 c./s., and a sub-carrier frequency of, for example, 50 kc./s. with a sweep of approximately 15 to 25 kc./s. which is frequency-modulated by the difference signal, the resulting modulation signal, which lies within the band of from 30 to 65,000 c./s., frequency-modulates the carries frequency having a frequency of about 100 mc./s. with a sweep of 75 kc./s.

The stereophonic receiver is provided with an antenna 1 and an intermediate-frequency stage 2 including a mixer stage and an oscillator 3 connected thereto, the intermediate-frequency oscillations of this oscillator, which are obtained by mixing and lie within the band of, for example, 10,700 kc./s., being supplied, after amplification and, if required, limitation in the intermediate-frequency stage 2, to an output band-pass filter comprising two coupled circuits 4 and 5.

The band-pass filter 4 and 5 forms part of a frequency detection device of a type known per se for the detection of normal frequency-modulation transmissions, and comprises two rectifiers 6 and 7 which are connected with opposite conductivities to the ends of the circuit 5 and to an output impedance 8, a centre tapping on the circuit 5 being connected to the end of a coupling coil 9 coupled to the circuit coil 4. The output impedance 8 of the frequency detector comprises a resistor 10, which is shunted by the series-connection of two capactiors 11 and 12 of which the junction is connected to earth, and by a smoothing capacitor 13, the output voltage of the frequency detector being taken from a centre tapping on the output resistor 10.

Thus, at the output impedance of the frequency detector an output voltage is produced which is constituted by the sum signal $A+B$ within the band of from 30 to 15,000 c./s. and by the difference signal $A-B$, which modulates the sub-carrier frequency in frequency and lies within the frequency band of from 25 to 75 kc./s., and this output voltage is supplied to a device 14 to be described more fully hereinafter, in order to recover the coherent stereophonic signals A and B which, after low-frequency amplification in separate low-frequency amplifiers 15 and 16, are supplied to reproducing devices 17 and 18.

The low-frequency amplifiers 15 and 16, which are designed similarly, comprise triodes provided with grid leak resistors 19 and 20 and non-shunted cathode resistors 21, 22 and 23, 24, which provide a negative feedback of the triodes 15 and 16. The amplified coherent stereophonic signals A and B are taken from output resistors 25 and 26 connected in the anode circuits of the triodes 15 and 16 respectively, which output resistors are connected, through blocking capacitors 27 and 28, to the reproducing devices 17 and 18, respectively, as is shown diagrammatically in the figure.

In order to recover the coherent stereophonic signals A and B from the output voltage of the frequency detector 6, 7 in a simple manner, whilst achieving an excellent quality of reproduction, the stereophonic receiver is provided with two amplitude detection devices 29 and 30 which are connected with opposite conductivity with respect to each other and are each provided with a rectifier cell and an output impedance which is connected to this rectifier cell and comprises the parallel-combination of a resistor 31 and 32 respectively and a capacitor 33 and 34 respectively, the input circuits of these amplitude detection devices 29 and 30 being connected in parallel to the output circuits of the frequency detector 6, 7 through a transmission network 35, the transmission factor of this network being substantially independent of the frequency for the audio-frequency sum signal $A+B$ and varying in substantially linear relationship with the frequency for the sub-carrier frequency frequency-modulated by the difference signal $A-B$, while the output voltages of the amplitude detection devices 29 and 30 are applied, through blocking capacitors 36 and 37, respectively, to the control grids of the triodes 15 and 16, respectively, which are connected as low-frequency amplifiers.

In the embodiment shown, the transmission network comprises two parallel-connected branches, one branch being provided with a series capacitor 38 and a parallel resistor 39, which acts as a differentiating network for the frequency-modulated sub-carrier frequency, while the other branch is provided with a parallel resistor 40 connected to the input terminals of the transmission network and succeeded by a low-pass filter comprising a series resistor 41 and a parallel capacitor 42, which filter passes only the audiofrequency sum signal $A+B$, the output circuits of both these branches being connected, through decoupling resistors 43 and 44, to a common output resistor 45. The zero damping of the transmission network which, for the audio-frequency sum signal $A+B$, has a substantially frequency-dependent transmission factor and, for the frequency-modulated sub-carrier frequency, a transmission factor which varies in proportion to the frequency of the sub-carrier, may, if required, be compensated for by an amplifier connected in series with the transmission network 35.

If there is set up at the input of the transmission network 35 the output voltage of the frequency detector 6, 7, which voltage comprises the audio-frequency sum signal $A+B$ and the difference signal $A-B$, which modulates the sub-carrier frequency in frequency, the transmission network 35 passes the audio-frequency sum signal $A+B$ faithfully and converts the frequency modulation of the sub-carrier frequency into an amplitude modulation, so that the audio-frequency sum signal $A+B$ and the difference signal $A-B$, which modulates the sub-carrier frequency in amplitude, are applied in parallel connection to the input of the described amplitude detection devices 29 and 30. These amplitude detection devices 29 and 30 each effect an amplitude detection of the difference signal $A-B$, which modulates the sub-carrier frequency in amplitude, the audio-frequency sum signal $A+B$ acting as a threshold voltage for the two rectifier cells 29 and 30 which are connected with opposite conductivity with respect to each other, so that the operating points of the two rectifier cells 29 and 30 are shifted in opposite directions in accordance with the sum signal. Thus, there are produced not only an amplitude detection of the envelope signal formed by the difference signal $A-B$, but also addition and subtraction of the audio-frequency difference and sum signals $A-B$ and $A+B$, with the result that there appear at the output circuits 31, 33 and 32, 34 of the amplitude detection devices 29 and 30, respectively, precisely the coherent stereophonic signals A and B, which are supplied to the two reproducing devices 17 and 18 through the two low-frequency amplifiers 15 and 16, respectively.

While the sterophonic receiver described is designed very simple, it provides the important advantage for a high-quality stereophonic reproduction that frequency-dependent phase shifts, which can only be produced in the transmission network, can be materially reduced, inter alia because the two branches of the transmission network 35 need not satisfy exacting requirements with respect to their selectivity. Without this phase characteristic being inconveniently influenced, an excessive penetration of the highest signal frequency of the audio-frequency sum signal $A+B$ through the differentiating network 38, 39 can be prevented by connecting in parallel to the output resistors 39 of the differentiating network 38 and 39 a damped series circuit 46, which may have a tuning frequency of say, approximately 13 kc./s.

It is of advantage for the output impedance of the transmission network 35, which is substantially determined by the resistors 43, 44 and 45, to be at least equal to from ¼ to ⅓ of the discharge resistors 31 and 32 of the detector capacitors 33 and 34, respectively, for it is found that the resulting increase of the charging time constants of the detector capacitors 33 and 34 relative to the discharge time constants acts favourably upon the reduction of the detection distortions occurring in the detection of the sub-carrier frequency which is comparatively low as compared with the frequency of the voltage modulating it. If the output of the transmission network is an amplifier, the output impedance of this amplifier must be made sufficiently large for the above-mentioned reason.

It was found that not only the stereophonic receiver described had an excellent quality of reproduction and a fixed phase relationship, but also the cross-talk between the two channels, which may be due to mutual couplings or to a difference in level between the $A+B$ signal and the $A-B$ signal, could be reduced to less than 25 to 35 db through the entire audio-frequency band of 15 kc./s., for it was ascertained that the cross-talk voltage have a fixed phase relationship with respect to the stereophonic signals A and B, in particular these cross-talk voltages are substantially in phase with or in phase opposition to the stereophonic signals A and B. In the stereophonic receiver described, an effective cross-talk reduction is obtained in a simple manner by the use of a compensating method which consists in that there is connected to a point of each of the receiver channels an attenuator having a suitable degree of attenuation, which attenuator is fed with a signal voltage which is derived from the other channel and is in phase opposition to the cross-talk voltage concerned.

In particular, it has been found that the voltages in the two channels can be represented by:

$$A\pm\alpha B$$

and $$B\pm\alpha A$$

respectively, where $\alpha$B and $\alpha$A represent the cross-talk voltages and $\alpha$ the cross-talk factors, which are equal in value and in phase, and this permits of a further simplification of the cross-talk compensation. A will be appreciated from the above-mentioned formulas, the two cross-talk factors may have either a positive or a negative value.

If the cross-talk factors $\alpha$ have a negative polarity, so that the signals in the two channels can be represented by $A-\alpha B$ and $B-\alpha A$, in the embodiment described the cross-talk is compensated for by connecting, between the two output impedances 31, 33 and 32, 34 of the amplitude detection devices 29 and 30 respectively, a connecting resistor 48 which is bridged by a capacitor 47 and the time constant of which is approximately equal to the time constants of the output impedances 31, 33 and 32, 34, of the amplitude detection devices 29 and 30 respectively. The network 47, 48 forms a frequency-independent voltage divider with each of the output impedances 31, 33 and 32, 34 of the amplitude detection devices 29 and 30, respectively, so that a fraction of the output voltage of the amplitude detector 30 is supplied, through the network 47, 48, to the output circuit 31, 33 of the amplitude detector 29 and at the same time an equal fraction of the output voltage of the amplitude detector 29 is supplied to the output circuit 32, 34 of the amplitude detector 30. If the impedance of the network 47, 48 is adjusted so that the voltage division ratio is exactly equal to the cross-talk factor $\alpha$, a complete cross-talk compensation is obtained, for in this event the value of the compensation voltage supplied through the network 47, 48, which voltage is in phase opposition to the cross-talk voltage, is made exactly equal to the cross-talk voltage. Experiments have shown that very good results can be obtained even if the capacitor 48 is omitted from the compensating network 47, 48.

When the cross-talk factors $\alpha$ have a positive value, the signals in the two channels being represented by $A+\alpha B$ and $B+\alpha A$, the compensation is effected similarly by connecting a connecting resistor 49 between the cathode resistors 21, 22 and 23, 24 of the amplifier valves. In a practical embodiment, the grid leak resistors 19 and 20 of the amplifier valves 15 and 16 respectively are connected to tappings on the cathode resistors 21, 22, and 23, 24 respectively, so that larger cathode resistors 21, 22 and 23, 24 can be used for the compensation, and this is of advantage for practical reasons.

As has been stated hereinbefore, an effective compensation of the cross-talk can be obtained in a simple manner for any values of the cross-talk factors, if the network 47, 48 and the resistor 49 are both used. However, for the adjustment of this cross-talk compensation only one of these compensating networks 47, 48 and 49 need be variable, for if the network 47, 48 or the resistor 49 is adjusted to a value such as to cause the cross-talk factors $\alpha$ always to have a certain polarity, this cross-talk can always be compensated for by suitable adjustment of the other compensating network 49 or 47, 48. For this purpose, preferably the network 47, 48 connected between the output impedances of the amplitude detection devices 29 and 30 is fixed and the resistor 49 is variable.

It is pointed out that a reduction of the cross-talk can also be obtained in the stereophonic receiver described by adjusting the relative levels of the sum signal $A+B$ and of the difference signal $A-B$ modulating the sub-carrier frequency, which are supplied to the amplitude detection devices, to suitable values for example, by designing the input resistor 40 of the transmission network 35 as a variable voltage divider.

Summing up, it is found that the stereophonic receiver concerned has all the features required for an excellent stereophonic reproduction, that is to say an excellent quality of reproduction, a fixed phase relationship and a cross-talk reduced to less than 25 to 35 db, which is amply sufficient for an excellent stereophonic reproduction. The stereophonic receiver is structurally simple so that its cost can be materially reduced, for example, the amplifier valves 15 and 16 may be designed as one double valve; the additional cost of the stereophonic receiver substantially amounts to the cost of an additional amplifier, which may be required to compensate for the damping of the transmission network 35, and to the cost of an additional loudspeaker. Furthermore, this stereophonic receiver is suitable for stereophonic gramophone reproduction due to its symmetrical structure, while it can also be adapted to normal FM-reception by connecting, by means of a double-poled switch 50, the input of the transmission network 35 directly to the outputs 31, 33 and 32, 34 of the two applitude detection devices 29 and 30, respectively.

The following details are given of an apparatus which was extensively tested in practice.

| | |
|---|---|
| Capacitor 38 | 330 μμf. |
| Resistor 39 | 1 KΩ |
| Resistor 40 | 10 KΩ |
| Resistor 40 | 10 KΩ |
| Capacitor 42 | 1000 μμf. |
| Resistor 43 | 56 KΩ |
| Resistor 44 | 56 KΩ |
| Resistor 45 | 200 KΩ |
| Resistor 49 | 100 KΩ |
| Valves 15, 16 | ECC83 |
| Diodes 29, 30 | OA81 |
| Resistors 31, 32 | 100 KΩ |
| Capacitors 33, 34 | 1000 μμf. |
| Resistor 47 | 100 KΩ |
| Capacitor 48 | 470 μμf. |
| Resistors 21, 23 | 1.8 KΩ |
| Resistors 22, 24 | 82 KΩ |

Finally, it should be noted that the use of the connecting resistor 47 between the output impedance 31, 33 and 32, 34 involves additional advantages, for through this connecting resistor 47 a fraction of the signal voltage set up at the output impedance 31, 33 is applied to the output impedance 32, 34 and conversely, so that at each of these output impedances 31, 33 and 32, 34 a signal component $\beta(A+B)$ is produced which is in phase with the sum signal $A+B$ supplied to the amplitude detection devices 29 and 30, with the result that the operating point shifts of the diodes 29 and 30 by the sum signal $A+B$ are reduced, and this may be of importance for a further improvement of the quality of reproduction.

The transmission network 35 can be designed variously, provided that the transmission factor has a frequency-independent variation for the audio-frequency sum signal and varies in linear relationship with the frequency for the frequency-modulated sub-carrier frequency.

FIG. 2 shows a transistorized stereophonic receiver of the type described, in which furthermore the transmission network 35 shown in FIG. 1 is modified. Similar elements are designed by like reference numerals.

Similarly to the embodiment shown in FIG. 1, the transmission network 35 comprises two parallel branches, one branch comprising a differentiating network consisting of a series capacitor 38 and a parallel resistor 39 succeeded by a decoupling resistor 43, while the second branch which is connected between the input and output terminals of the first arm, comprises the series combination of a series resistor 51 and a low-pass filter consisting of a series resistor 52 and a parallel capacitor 53, the series resistor 51 being designed variable to enable relative level control of the sum signal $A+B$ and of the difference signal $A-B$ modulating the sub-carrier frequency.

As has been described already with reference to FIG. 1, the coherent stereophonic signals A and B are taken from the output circuits 31, 33 and 32, 34 of the two amplitude detection devices and supplied, for further application, to a transistor amplifier provided with two transistors 54 and 55 in common emitter arrangement. The transistors 54 and 55 each have a collector resistor 56 and 57 respectively in their collector circuits, the reproducing devices 17 and 18 being connected to these collector resistors through blocking capacitors 27 and 28, respectively, while the collectors are connected to the relative bases through resistors 58 and 59, respectively. The emitter circuits of the transistors 54 and 55 each include an emitter resistor 60 and 61, respectively, which are connected to one another through an adjustable connecting resistor 62 in order to provide cross-talk compensation. In the manner described with reference to FIG. 1, in these devices the coherent stereophonic signals A and B are reproduced by the reproducing devices 17 and 18, and tests have shown that the stability of the transistorized stereophonic receiver described is sufficient for stereophonic reception.

The following details are given of the stereophonic broadcast receiver described.

| | |
|---|---|
| Transistors 44, 45 | OC71 |
| Resistors 56, 57 | 5.6 KΩ |
| Resistors 60, 61 | 3.9 KΩ |
| Resistors 58, 59 | 47 KΩ |
| Resistor 62 | 5 KΩ |

As has been stated hereinbefore, the transmission network 35 can be designed in a manner different from those shown in FIGS. 1 and 2, for example, in order to obtain a transmission factor varying in linear relationship with the sub-carrier frequency, the differentiating network may be replaced by two coupled circuits or by other networks having a frequency discrimination characteristic, however, networks of the kind shown in FIGS. 1 and 2 offer special advantages since by their use a transmission factor which varies in linear relationship with the frequency through the comparatively broad frequency band of the sub-carrier frequency is obtained by means of very simple components. In addition, it is of advantage that the tolerances of these components need not satisfy specific requirements and this renders the stereophonic receiver described particularly attractive for large-scale manufacture.

In order to recover the coherent stereophonic signals A and B, in the embodiments shown in FIGS. 1 and 2, the sum signal $A+B$ is supplied, together with the difference signal $A-B$ modulating the sub-carrier frequency, in phase to the amplitude detection devices 29 and 30 connected with opposite conductivity to one another, however, for this purpose the sum signal $A+B$ may alternatively be supplied to the two amplitude detection devices in phase opposition, in which event the amplitude detection devices must be connected with the same conductivity. For this purpose, use may be made of a frequency detector 6, 7 having a push-pull output circuit with respect to earth, each of the push-pull output voltages being connected, through a transmission network, to one of the amplitude detection devices connected with equal conductivity. It is a feature of all these embodiments that the amplitude detection devices to which, through the transmission network, the audio-frequency sum signal $A+B$ and the difference signal $A-B$, which modulates the sub-carrier frequency in amplitude, are jointly supplied, are connected with opposite conductivity with respect to the audio-frequency sum signal $A+B$. Tests have shown that the embodiments shown in FIGS. 1 and 2 are to be preferred, inter alia because of better reproduction and simplicity in design.

Finally, it should be mentioned that the simplicity of the stereophonic reproducing device described renders it highly suitable for use for magnetic tape reproduction, for the audio-frequency sum signal $A+B$ and the difference signal $A-B$ modulating the sub-carrier frequency can be recorded in one track and reproduced by a single reproducing head, so that no radical changes need be made in existing tape recording apparatus.

What is claimed is:

1. A circuit for the stereophonic reproduction of signals of the type comprising a sum signal that is the sum of first and second coherent stereophonic signals, and a difference signal that is the difference of said first and second coherent stereophonic signals frequency modulated on a subcarrier wave, said circuit comprising a transmission network having input and output circuits, said network having a transmission factor substantially independent of frequency for signals of the frequency of said sum signal and a substantially linear relationship with frequency for signals of the frequency of said subcarrier wave, means applying said sum and difference signals to said input circuit, first and second amplitude detection devices connected to said output circuit, said first and second detection devices being connected with opposite conductivity with respect to said sum signal, and means for deriving said first and second stereophonic signals from said first and second detection devices respectively.

2. A circuit for the stereophonic reproduction of signals of the type comprising a sum signal that is the sum of first and second coherent stereophonic signals, and a difference signal that is the difference of said first and second coherent stereophonic signals frequency modulated on a subcarrier wave, said circuit comprising a transmission network having a pair of input terminals and a pair of output terminals, said transmission network having a transmission factor substantially independent of frequency for signals of the frequency of said sum signal and a substantially linear characteristic with frequency for signals of the frequency of said subcarrier wave, means applying said sum and difference signals between said input terminals, first and second amplitude detection circuits each comprising a series connected rectifier and resistor, means connecting said first and second amplitude detection circuits in parallel between said output terminals, and first and second output circuit means connected to the junctions of the rectifiers and resistors of said first and second amplitude detection circuits respectively, the rectifiers of said detection circuits being connected with opposite polarity with respect to said output terminals.

3. A circuit for the stereophonic reproduction of signals of the type comprising a sum signal that is the sum of first and second coherent stereophonic signals, and a difference signal that is the difference of said first and second coherent stereophonic signals frequency modulated on a subcarrier wave, said circuit comprising a transmission network having an input circuit and a pair of output terminals, said network comprising first and second parallel connected branches, said first branch comprising a differentiating network for signals of the frequency of said difference signal, said second branch comprising a low pass filter for passing signals of the frequency of said sum signal, means applying said sum and difference signals to said input circuit, first and second amplitude detection circuits each comprising a series connected rectifier and resistor, means connecting said first and second amplitude detection circuits in parallel between said output terminals, and first and second output circuit means connected to the junctions of the rectifiers and resistors of said first and second amplitude detection circuits respectively, the rectifiers of said detection circuits being connected with opposite polarity with respect to said output terminals.

4. The circuit of claim 3 comprising variable impedance means connected in said second branch.

5. The circuit of claim 3 comprising a damped series resonant circuit tuned substantially to the highest frequency of said sum signal, and means connecting said resonant circuit in parallel with the output of said first branch.

6. The circuit of claim 3 comprising means for simultaneously shorting said transmission network and for connecting the junctions of said diodes and resistors together.

References Cited in the file of this patent

UNITED STATES PATENTS

| | | |
|---|---|---|
| 2,698,379 | Boelens et al. | Dec. 28, 1954 |
| 2,779,020 | Wilmotte | Jan. 22, 1957 |
| 2,851,532 | Crosby | Sept. 9, 1958 |